US009966163B2

(12) United States Patent
Sawada

(10) Patent No.: US 9,966,163 B2
(45) Date of Patent: May 8, 2018

(54) ELECTRIC CONTACT MATERIAL FOR CONNECTOR AND METHOD FOR PRODUCING SAME

(71) Applicants: AUTONETWORKS TECHNOLOGIES, LTD., Yokkaichi-shi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Shigeru Sawada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 29 days.

(21) Appl. No.: 15/025,777

(22) PCT Filed: Sep. 10, 2014

(86) PCT No.: PCT/JP2014/073859
§ 371 (c)(1),
(2) Date: Mar. 29, 2016

(87) PCT Pub. No.: WO2015/045856
PCT Pub. Date: Apr. 2, 2015

(65) Prior Publication Data

US 2016/0247592 A1 Aug. 25, 2016

(30) Foreign Application Priority Data

Sep. 30, 2013 (JP) ................................ 2013-203103

(51) Int. Cl.
*B32B 15/00* (2006.01)
*H01B 1/02* (2006.01)
(Continued)

(52) U.S. Cl.
CPC ............... *H01B 1/026* (2013.01); *C25D 3/12* (2013.01); *C25D 3/22* (2013.01); *C25D 3/30* (2013.01);
(Continued)

(58) Field of Classification Search
None
See application file for complete search history.

(56) References Cited

U.S. PATENT DOCUMENTS 5,780,172 A * 7/1998 Fister ...................... B32B 15/01 428/647
5,849,424 A * 12/1998 Sugawara ................ C22F 1/08 148/536
(Continued)

FOREIGN PATENT DOCUMENTS

JP 2000164279 * 6/2000 ............. H01R 13/03
JP 2007-237251 A 9/2007
(Continued)

OTHER PUBLICATIONS

Cho et al., "Interfacial Reactions and Microstructures of Sn0.7Cu-xZn Solders with Ni—P UBM During Thermal Aging", Jun. 2009, Journal of Electronic Materials, vol. 38, pp. 2242-2250.*
(Continued)

*Primary Examiner* — Seth Dumbris
(74) *Attorney, Agent, or Firm* — Oliff PLC

(57) ABSTRACT

An electric contact material for a connector includes a base material made of a metal material; an alloy layer that is formed on the base material and made of an alloy containing at least three elements including Sn and Cu as well as at least
(Continued)

one metal selected from Zn, Co, Ni, and Pd; and a conductive coating layer formed on the surface of the alloy layer. The alloy layer contains an intermetallic compound obtained by replacing some of the Cu atoms in $Cu_6Sn_5$ with at least one metal selected from Zn, Co, Ni, and Pd. It is preferable that the content of at least one metal selected from Zn, Co, Ni, and Pd in the alloy layer is in a range of 1 to 50 atom % when the total content of the metal and Cu is regarded as 100 atom %.

20 Claims, 13 Drawing Sheets

(51) Int. Cl.

| | |
|---|---|
| ***C25D 5/12*** | (2006.01) |
| ***C25D 7/00*** | (2006.01) |
| ***H01R 13/03*** | (2006.01) |
| ***C25D 3/12*** | (2006.01) |
| ***C25D 3/22*** | (2006.01) |
| ***C25D 3/30*** | (2006.01) |
| ***C25D 3/38*** | (2006.01) |
| ***C25D 5/10*** | (2006.01) |
| ***C25D 5/50*** | (2006.01) |
| *C22C 9/02* | (2006.01) |
| *C25D 5/34* | (2006.01) |

(52) U.S. Cl.

CPC ................ *C25D 3/38* (2013.01); *C25D 5/10* (2013.01); *C25D 5/12* (2013.01); *C25D 5/50* (2013.01); *C25D 5/505* (2013.01); *C25D 7/00* (2013.01); *H01R 13/03* (2013.01); *C22C 9/02* (2013.01); *C25D 5/34* (2013.01); *Y10T 428/1259* (2015.01); *Y10T 428/1291* (2015.01); *Y10T 428/12611* (2015.01); *Y10T 428/12618* (2015.01); *Y10T 428/12667* (2015.01); *Y10T 428/12708* (2015.01); *Y10T 428/12722* (2015.01); *Y10T 428/12882* (2015.01); *Y10T 428/12903* (2015.01); *Y10T 428/12917* (2015.01)

(56) References Cited

U.S. PATENT DOCUMENTS

| | | | | |
|---|---|---|---|---|
| 2009/0304545 A1 | 12/2009 | Tanaka et al. | | |
| 2014/0170436 A1 | 6/2014 | Taninouchi et al. | | |
| 2014/0264843 A1* | 9/2014 | Lin | ......................... | H01L 24/81 257/737 |

FOREIGN PATENT DOCUMENTS

| | | | | |
|---|---|---|---|---|
| JP | 2010215979 | * 9/2010 | ............... | C25D 5/24 |
| JP | 2010-267418 A | 11/2010 | | |
| JP | 2011-012350 A | 1/2011 | | |
| JP | 2011-026677 A | 2/2011 | | |
| JP | 2012-237055 A | 12/2012 | | |
| JP | 2012237055 | * 12/2012 | ............. | C23C 14/16 |
| JP | 2013-174006 A | 9/2013 | | |

OTHER PUBLICATIONS

Dec. 9, 2014 Search Report issued in International Patent Application No. PCT/JP2014/073859.

* cited by examiner

ELECTRIC CONTACT MATERIAL FOR CONNECTOR AND METHOD FOR PRODUCING SAME

TECHNICAL FIELD

The present disclosure relates to an electric contact material for a connector, and a method for producing the same.

BACKGROUND ART

Copper alloys are mainly used as an electric contact material for connectors. The formation of a nonconductor or an oxide coating having a high electric resistivity on the surface of a copper alloy causes the risks that contact resistance is increased and a function of the electric contact material is deteriorated.

Therefore, when a copper alloy is used as an electric contact material, there are cases where a layer of noble metal, such as Au or Ag, which is unlikely to be oxidized, is formed on the surface of the copper alloy with a plating treatment or the like. However, it is expensive to form a noble metal layer, and therefore, in general, Sn plating, which is inexpensive and has a relatively high corrosion resistance, is frequently used.

On the other hand, a Sn plating film is relatively soft, and therefore, when provided on the surface of the electric contact material, there is a risk that the Sn plating film is worn out in an early stage, thus causing an increase in the contact resistance. Furthermore, when a terminal is inserted in which the electric contact material provided with the Sn plating film is used, insertion force disadvantageously increases.

In order to deal with these conventional problems, a technique for forming a CuSn-alloy layer on the outermost surface of the electric contact material for a connector (Patent Document 1), a technique for forming a layer of Sn or a Sn alloy on the outermost surface and forming a layer of an alloy containing an intermetallic compound mainly including Cu—Sn thereunder (Patent Document 2), and a technique for forming a $Ag_3Sn$-alloy layer on a Sn-based plating layer (Patent Document 3) have been proposed.

However, with the above-mentioned conventional techniques, the foregoing problems have not been sufficiently solved. Therefore, as a result of intensive research, the inventors developed a method in which, after a layer of an alloy such as NiSn or CuSn is formed on a base material, an insulating oxide layer formed thereon is once removed, and then an oxidizing treatment is performed again. With this method, a layer of a mixed oxide including $NiO_x$ ($x \neq 1$) and $SnO_y$ ($y \neq 1$), a layer of a mixed oxide including $CuO_x$ ($x \neq 1$) and $SnO_y$ ($y \neq 1$), or a layer of a mixed hydroxide is formed on the surface of the alloy layer. Since the oxide layer or hydroxide layer is conductive and suppresses the oxidation of the alloy layer, the conductivity of an electric contact can be maintained for a long period of time, and low contact resistance can be stably achieved. Since the alloy layer formed on the base material is hard and excellent in wear resistance and has a low friction coefficient, it is possible to made the insertion force sufficiently small when the terminal is inserted (Patent Document 4).

CITATION LIST

Patent Documents

Patent Document 1: JP 2010-267418A
Patent Document 2: JP 2011-12350A
Patent Document 3: JP 2011-26677A
Patent Document 4: JP 2012-237055A

SUMMARY

Technical

However, when the technique described in Patent Document 4 above is applied, it is necessary to perform a step of once removing the insulating oxide layer, and therefore, a problem arises in that the process becomes complicated. Therefore, there has been demand for the development of a method for producing an electric contact material for a connector with which stable contact resistance can be maintained for a long period of time without performing the step of once removing the insulating oxide layer formed during alloying, and furthermore, a conductive layer of an oxide or a hydroxide can be easily formed on the surface.

Furthermore, although an electric contact material in which CuSn alloy is used as the alloy layer exhibits relatively stable contact resistance properties even after left in a high-temperature state, a problem has been pointed out in that the contact resistance increases when the electric contact material is exposed to a high-humidity environment. There has also been demand for the development of an electric contact material with which this problem can be solved.

The present disclosure provides an electric contact material for a connector that can be easily produced and with which stable contact resistance can be maintained for a long period of time even when the electric material is left in a high-humidity environment, and a method for producing the same.

Solution to Problem

An aspect of the disclosed embodiments is an electric contact material for a connector including:

a base material made of a metal material;

a ternary alloy layer that is formed on the base material and contains Sn and Cu as well as one metal selected from Zn, Co, Ni, and Pd; and a conductive coating layer formed on a surface of the alloy layer, wherein the alloy layer contains an intermetallic compound obtained by replacing some Cu atoms in $Cu_6Sn_5$ with one metal selected from Zn, Co, Ni, and Pd.

Another aspect of the disclosed embodiments is a method for producing an electric contact material for a connector including:

forming a multilayered metal layer by laminating a Sn layer, a Cu layer, and an M layer (the M layer being a metal layer having at least one layer made of at least one metal selected from Zn, Co, Ni, and Pd) on a base material made of a metal material such that a metal layer made of a metal that is least likely to be oxidized in the metal layers is an outermost layer; and performing a reflow treatment in which the multilayered metal layer is heated in an oxidizing atmosphere after forming the multilayered metal layer, an alloy layer that is made of an alloy containing at least three elements including Sn and Cu as well as at least one metal selected from Zn, Co, Ni, and Pd and that contains an intermetallic compound obtained by replacing some Cu atoms in $Cu_6Sn_5$ with at least one metal selected from Zn, Co, Ni, and Pd being formed on the substrate, and a conductive coating layer being formed on a surface of the alloy layer.

Advantageous Effects

The above electric contact material for a connector includes, as the above-mentioned alloy layer, a ternary alloy layer containing Sn (tin) and Cu (copper) as well as one metal selected from Zn (zinc), Co (cobalt), Ni (nickel), and Pd (palladium). In addition, this alloy layer contains the above-mentioned specific intermetallic compound. Accordingly, the above-mentioned electric contact has a remarkably improved durability in a case where the electric contact is left in a high-humidity environment compared with the case where a conventional alloy layer made of a binary alloy containing CuSn is provided. This is clear from working examples and a comparative example, which will be described later.

Such an electric contact material for a connector including an alloy layer that is made of an alloy containing at least three elements can be easily produced by employing the above producing method including the above-mentioned step of forming a multilayered metal layer and a step of performing a reflow treatment. That is, it is not necessary to perform the step of removing an oxide film in a conventional manner, and it is easy to form the above-mentioned alloy layer and a conductive coating layer made of a conductive oxide or hydroxide on the alloy layer by merely performing the reflow treatment on the above-mentioned multilayered metal layer.

In this manner, with the disclosed embodiments, it is possible to obtain an electric contact material for a connector that can be easily produced and with which stable contact resistance can be maintained for a long period of time even when the electric contact material is left in a high-humidity environment, and a method for producing the same.

DESCRIPTION OF EMBODIMENTS

Figure 1:
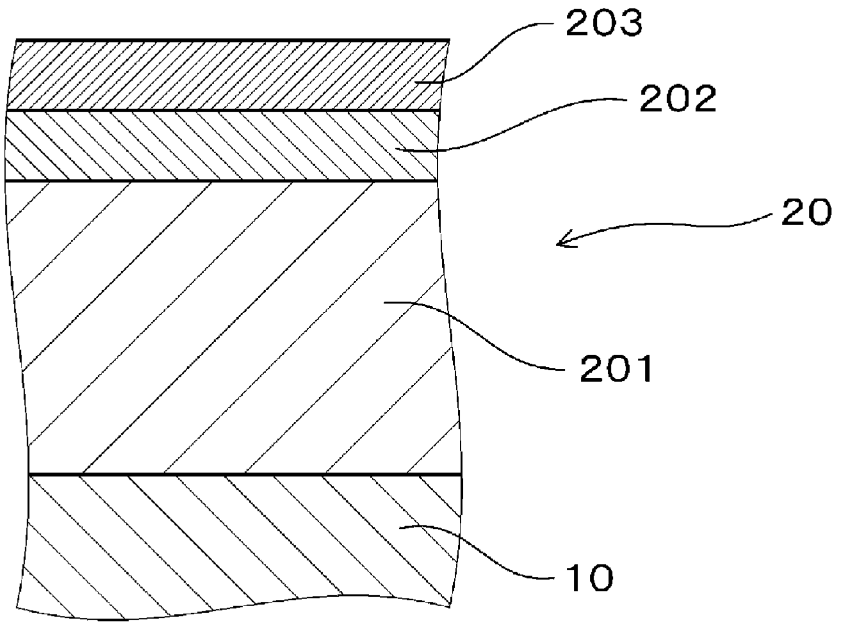
FIG. 1 is an explanatory diagram illustrating a state in which a multilayered metal layer is formed on a base material in Working Example 1.

The above-mentioned base material of the above electric contact material for a connector can be selected from various conductive metals. Specifically, it is preferable to use Cu, Al (aluminum), and Fe (iron), or an alloy thereof as the above-mentioned base material. These metal materials are excellent in not only conductivity but also moldability and springiness, and can be applied to various embodiments of electric contacts. The base material may have various shapes such as a stick shape and a plate shape, and its dimensions such as a thickness can be selected as appropriate according to the application. It should be noted that in general, the thickness is preferably set to about 0.2 to 2 mm.

A diffusion barrier layer may be provided on the surface of the above-mentioned base material. With this diffusion barrier layer, blistering, peeling, or the like of the alloy layer formed on the base material can be suppressed. It should be noted that if such a problem does not arise, the diffusion barrier layer does not necessarily have to be provided, thus making it possible to correspondingly reduce the cost. For example, when the above-mentioned base material is a Cu alloy, it is preferable to use a Cu plating layer having a thickness of about 0.5 μm as the diffusion barrier layer. In addition, a Ni plating layer, a Co plating layer, or the like can also be used.

As mentioned above, the above alloy layer contains Sn and Cu as essential elements, as well as a $(Cu, M)_6Sn_5$ metal compound obtained by adding at least one metal selected from Zn, Co, Ni, and Pd to replace Cu atoms in a $Cu_6Sn_5$ metal compound with at least one metal (M) selected from Zn, Co, Ni, and Pd.

Here, it is preferable that the content of at least one metal selected from Zn, Co, Ni, and Pd in the above-mentioned alloy layer is set to be in a range of 1 to 50 atom % when the total content of the metal and Cu is regarded as 100 atom %. Accordingly, a $(Cu, M)_6Sn_5$ intermetallic compound can be obtained. It is more preferable that the content of at least one metal selected from Zn, Co, Ni, and Pd is set to be in a range of 5 to 10 atom % when the total content of the metal and Cu is regarded as 100 atom %. Accordingly, it is possible to maintain the $(Cu, M)_6Sn_5$ intermetallic compound in a stable state.

Although the above-mentioned alloy layer can be made of an alloy containing at least three elements, it is particularly preferable to use a ternary alloy. Accordingly, it is possible to improve the properties of the alloy layer when the alloy layer is left in a high-humidity environment compared with at least a case of using a binary alloy, and to reduce the production cost compared with a case of using an alloy containing at least four elements.

The above-mentioned conductive coating layer is made of an oxide or a hydroxide containing the metal included in the above alloy layer, or both of them. The conductive coating layer can be constituted by a layer in which an oxide such as $CuO_x$ (x≠1), $CuO_2$, $SnO_x$ (x≠1), $NiO_x$ (x≠1), $ZnO_x$ (x≠1), $CoO_x$ (x≠1), or $PdO_x$ (x≠1) and a hydroxide are mixed, or be made of a compound including these oxides. The thickness of the conductive coating layer is preferably about 5 to 500 nm, and more preferably about 10 to 200 nm.

It should be noted that when an alloy layer made of an alloy containing at least three elements including Sn and Cu as well as at least one metal selected from Zn, Co, Ni, and Pd is adopted as the alloy layer, the above-mentioned electric contact material for a connector has a remarkably improved durability in a case where the electric contact material is left in a high-humidity environment compared with the case where a conventional alloy layer made of a binary alloy containing CuSn is provided. It is thought that the reason for this is as follows.

That is, the alloy layer made of CuSn, which is a binary alloy, generally includes, as a main phase, an intermetallic compound including $Cu_6Sn_5$. If this $Cu_6Sn_5$ continues to be present, excellent contact reliability is maintained. On the other hand, if the alloy layer is left in a high-humidity environment, it is conceivable that $Cu_6Sn_5$ changes to another intermetallic compound, namely $Cu_3Sn$, thus deteriorating the contact reliability.

In contrast, even when the alloy layer is left in a high-humidity environment, an intermetallic compound obtained by replacing some of the Cu atoms in $Cu_6Sn_5$ with the above-mentioned metal, namely $(Cu, M)_6Sn_5$ (M indicates at least one metal selected from Zn, Co, Ni, and Pd), is less likely to change to a metal compound in another form, namely $Cu_3Sn$-based metal compound, than $Cu_6Sn_5$. It is conceivable from this fact that even when the above-mentioned electric contact material for a connector provided with the alloy layer containing the above specific intermetallic compound is left in a high-humidity environment, contact resistance that is stabler than in a conventional case can be maintained for a long period of time.

WORKING EXAMPLES

Working Example 1

The above-mentioned electric contact material for a connector and a method for producing the same will be described with reference to the drawings.

Figure 2:
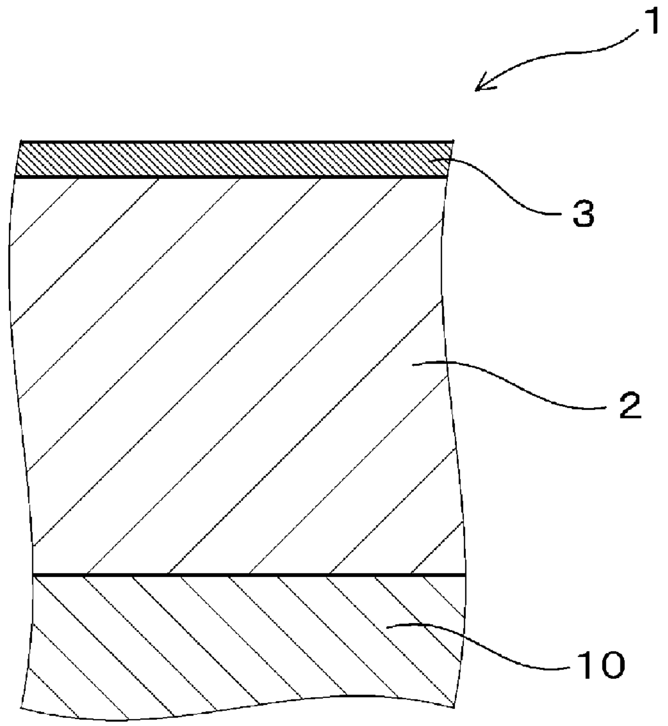
FIG. 2 is an explanatory diagram illustrating a configuration of an electric contact material for a connector in Working Example 1.

As shown in FIG. 2, an electric contact material 1 of this working example includes a base material 10 made of a metal material, a ternary alloy layer 2 that is formed on the base material 10 and contains Sn and Cu as well as Ni, and a conductive coating layer 3 formed on the surface of the alloy layer 2. The alloy layer 2 contains a $(Cu, Ni)_6Sn_5$ intermetallic compound obtained by replacing some of the Cu atoms in $Cu_6Sn_5$ with Ni. Hereinafter, a method for producing the electric contact material 1 and a more specific configuration of the electric contact material 1 will be described.

Producing Method

First, a plate-shaped material made of brass was prepared as the base material 10. It should be noted that the material and the form of the base material 10 can be changed as appropriate according to the application. Although a diffusion barrier layer was not provided on the surface of the base material 10 in this working example, a diffusion barrier layer can be added as necessary, as described above.

Next, as shown in FIG. 1, a multilayered metal layer 20 was formed by performing a plating treatment under the following conditions after an electrolytic degreasing treatment was performed on the surface of the base material 10. The multilayered metal layer 20 has a three-layer structure including a Sn layer 201 formed on the base material 10, a Ni layer 202 formed on the Sn layer 201, and a Cu layer 203 formed on the Ni layer 202.

Formation of Sn Layer
- Composition of liquid in plating bath
  - Stannous sulfate ($SnSO_4$): 40 g/L
  - Sulfuric acid ($H_2SO_4$): 100 g/L
  - Gloss material
- Liquid temperature: 20° C.
- Current density: 0.5 A/$dm^2$ Formation of Ni Layer
- Composition of liquid in plating bath
  - Nickel sulfate ($NiSO_4$): 265 g/L
  - Nickel chloride ($NiCl_2$): 45 g/L
  - Boric acid ($H_3BO_3$): 40 g/L
  - Gloss material
- Liquid temperature: 50° C.
- Current density: 0.5 A/$dm^2$ Formation of Cu Layer
- Composition of liquid in plating bath
  - Copper sulfate ($CuSO_4$): 180 g/L
  - Sulfuric acid ($H_2SO_4$): 80 g/L
  - Chloride ion: 40 mL/L
- Liquid temperature: 20° C.
- Current density: 1 A/$dm^2$ In the multilayered metal layer 20 obtained, the Sn layer 201 had a thickness of 1.5 μm, the Ni layer 202 had a thickness of 0.3 μm, and the Cu layer 203 had a thickness of 0.5 μm. These thicknesses were determined such that (Cu+Ni):Sn was about 6:5 in terms of the atom ratio. The Cu layer 203 is a metal layer made of a metal that is least likely to be oxidized in these metal layers, and therefore, the multilayered metal layer 20 was formed such that the Cu layer 203 was the outermost layer.

Next, a reflow treatment in which the multilayered metal layer 20 was heated in an oxidizing atmosphere was performed. Specifically, a heat treatment in which the multilayered metal layer 20 was maintained at a temperature of 300° C. for 3 minutes in an air atmosphere was performed. With this reflow treatment, the multilayered metal layer 20 changed to the alloy layer 2 and the conductive coating layer 3 formed on the surface of the alloy layer 2.

Analysis of Composition

The composition of the above-mentioned alloy layer 2 was analyzed with EDX (energy dispersive X-ray spectrometry). As a result, it was found that a $(Cu, Ni)_6Sn_5$ metal compound was formed in the alloy layer 2.

The composition of the conductive coating layer 3 was analyzed with XPS (X-ray photoelectron spectroscopy). As a result, it was found that a mixed oxide (or hydroxide) including an oxide (or hydroxide) of Sn, an oxide (or hydroxide) of Cu, and an oxide (or hydroxide) of Ni was formed in the conductive coating layer 3. It should be noted that the fact is that it is difficult to separately detect an oxide and a hydroxide with XPS.

Evaluation Test

A sample (referred to as "sample E1") collected from the electric contact material for a connector of this working example, which was obtained in the above-mentioned manner, was evaluated in three ways, namely by measuring the initial contact resistance (initial evaluation), the contact resistance after a high-temperature durability test (high-temperature durability test evaluation), and the contact resistance after a high-humidity durability test (high-humidity durability test evaluation). In the high-temperature durability test, a sample to be evaluated is maintained at a high temperature of 160° C. for 120 hours. In the high-humidity durability test, a sample to be evaluated is maintained in an atmosphere at a temperature of 85° C. and a relative humidity of 85% for 96 hours.

In the measurement of contact resistance in this working example, a change in contact resistance was analyzed under the conditions in which an Au (gold) material provided with a hemispherical embossed portion having a radius of 3 mm was used as a partner member, the hemispherical embossed portion was brought into contact with the sample to be evaluated, and a load applied therebetween was gradually increased and then reduced again. Each measurement test was performed at least multiple times (n=5 or more) using a plurality of samples.

Figure 3:
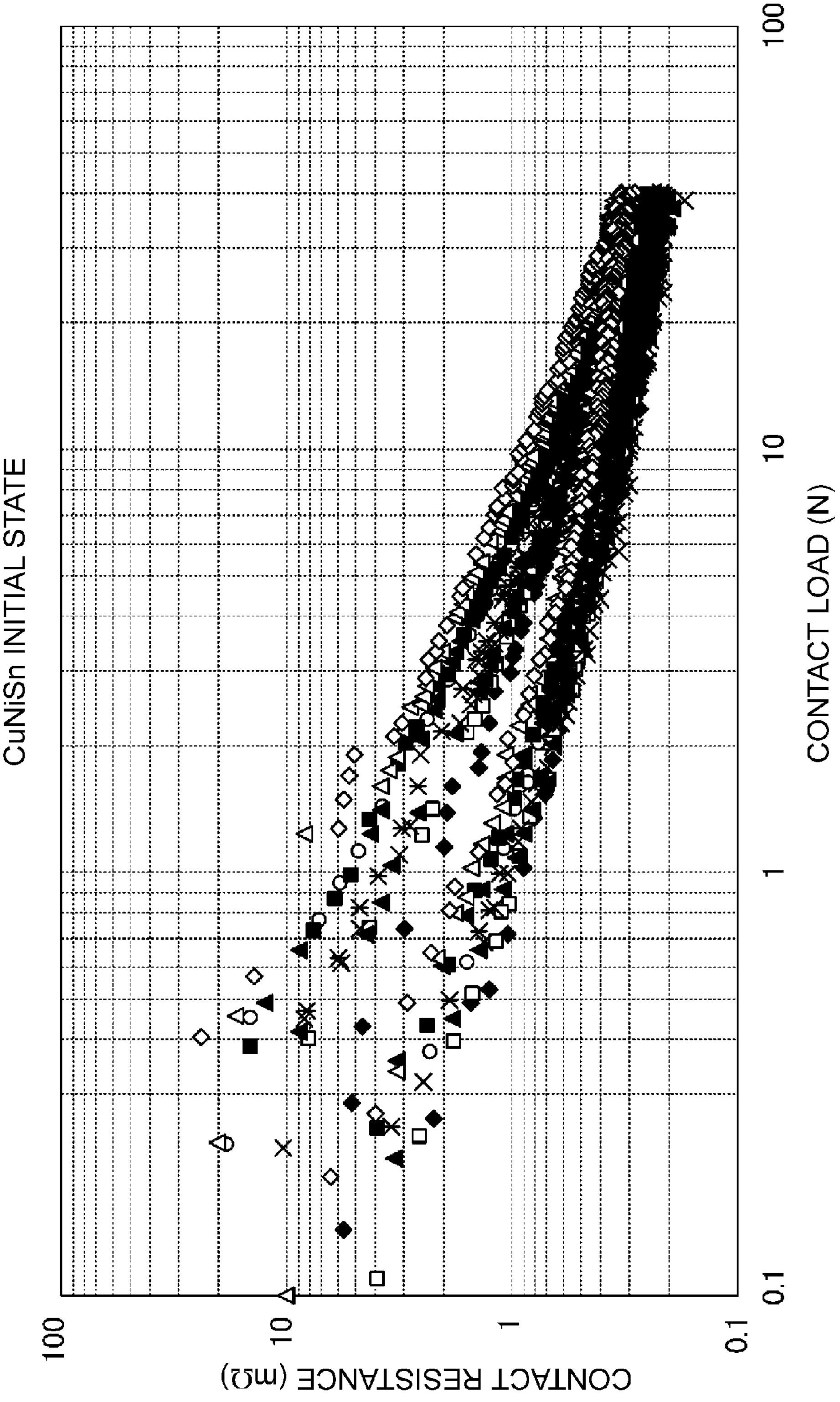
FIG. 3 is an explanatory diagram illustrating initial evaluation results from the electric contact material for a connector (sample E1) in Working Example 1.
Figure 4:
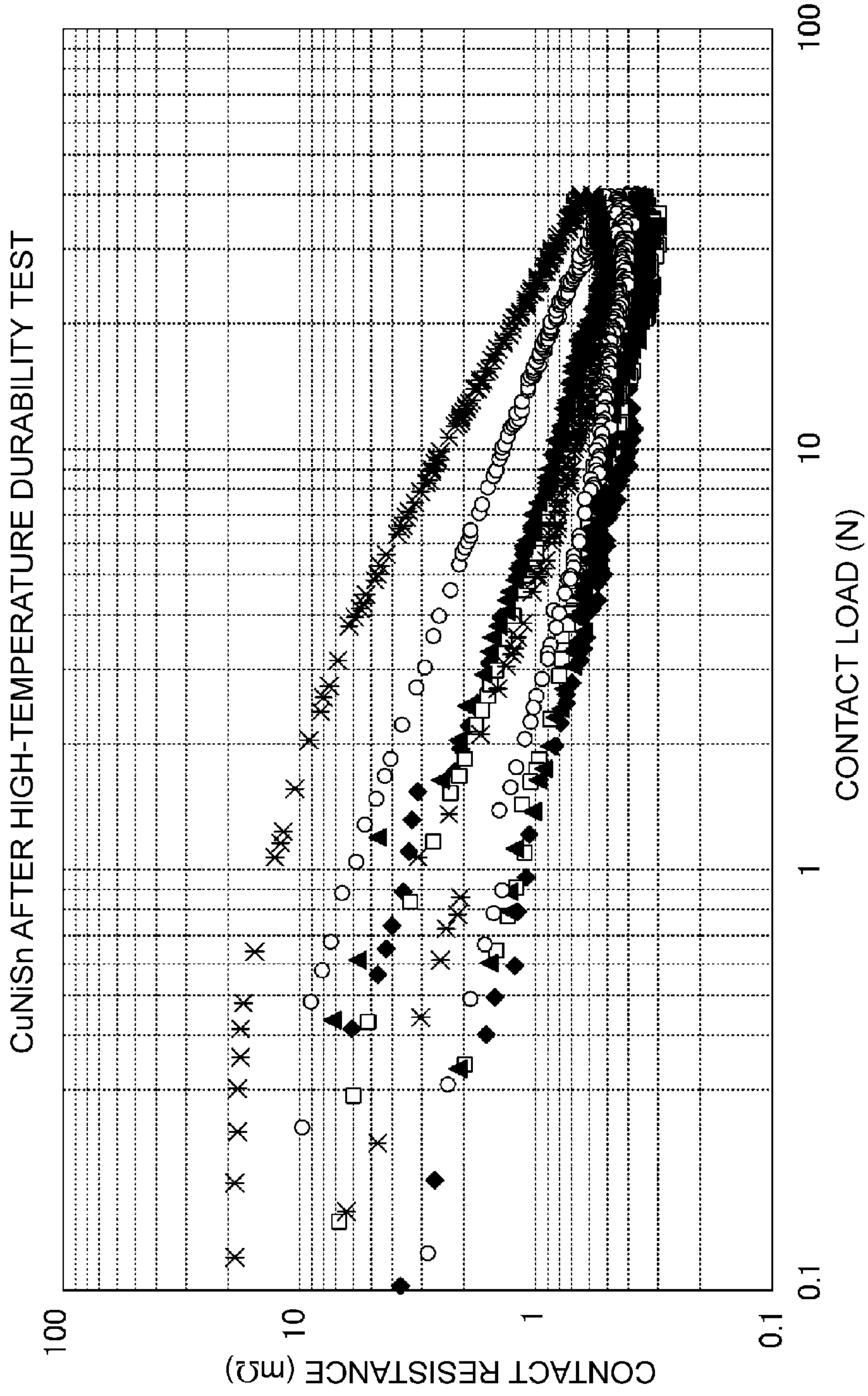
FIG. 4 is an explanatory diagram illustrating evaluation results from the electric contact material for a connector (sample E1) subjected to a high-temperature durability test in Working Example 1.
Figure 5:
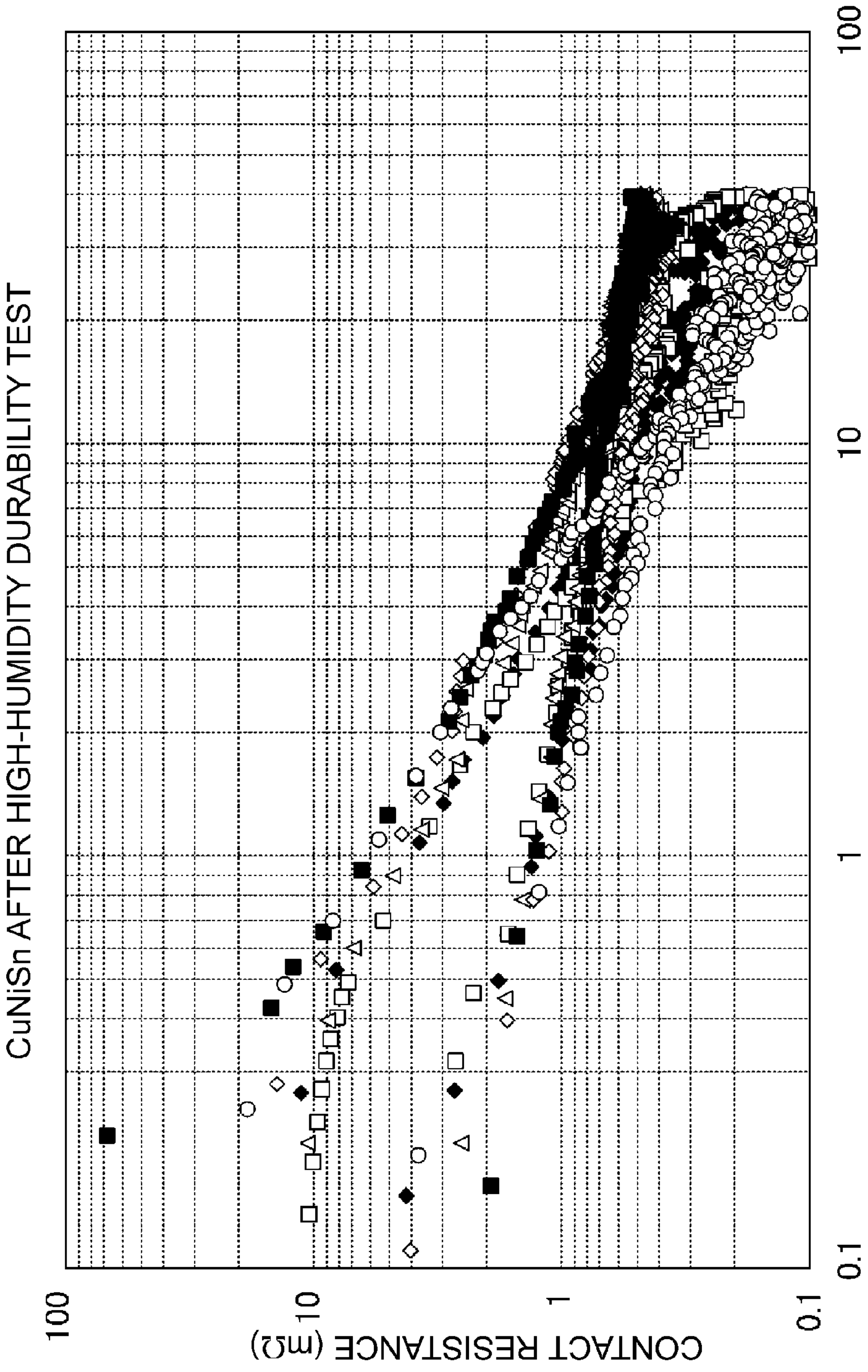
FIG. 5 is an explanatory diagram illustrating evaluation results from the electric contact material for a connector (sample E1) subjected to a high-humidity durability test in Working Example 1.

FIG. 3 shows the initial evaluation for sample E1, FIG. 4 shows the high-temperature durability test evaluation for sample E1, and FIG. 5 shows the high-humidity durability test evaluation for sample E1. In these diagrams, the horizontal axes indicate the contact load (N), and the vertical axes indicate the contact resistance (mΩ) (the same applies FIG. 6 to FIG. 14, which will be described later).

It is clear from these diagrams that although the contact resistance of the electric contact material for a connector of this working example (sample E1) was slightly higher in the high-temperature durability test evaluation and the high-humidity durability test evaluation than in the initial evaluation, all results were favorable because the values were maintained at sufficiently low levels. In particular, it is found that the deterioration after the high-humidity durability test was greatly suppressed compared with Comparative Example 1 provided with a binary alloy layer, which will be described later.

Working Example 2

In an electric contact material for a connector of this working example, the alloy layer 2 in Working Example 1 was changed to a ternary alloy layer containing Sn and Cu as well as Zn, and thus the composition of the conductive coating layer 3 was changed.

Producing Method

The electric contact material was produced in the same manner as in Working Example 1, except that a Zn layer was formed instead of forming the Ni layer in Working Example 1.

Formation of Zn Layer

Composition of liquid in plating bath

Zinc chloride ($ZnCl_2$): 60 g/L

Sodium chloride (NaCl): 35 g/L

Sodium hydroxide (NaOH): 80 g/L

Liquid temperature: 25° C.

Current density: 1 $A/dm^2$

Analysis of Composition

It was found from the results of the composition analysis with EDX that a $(Cu, Zn)_6Sn_5$ metal compound was formed in the alloy layer of the obtained working example. Moreover, it was found from the results of the composition analysis with XPS that a mixed oxide including an oxide (or hydroxide) of Sn, an oxide (or hydroxide) of Cu, and an oxide (or hydroxide) of Zn was formed in the conductive coating layer of the obtained working example.

Evaluation Test

Figure 6:
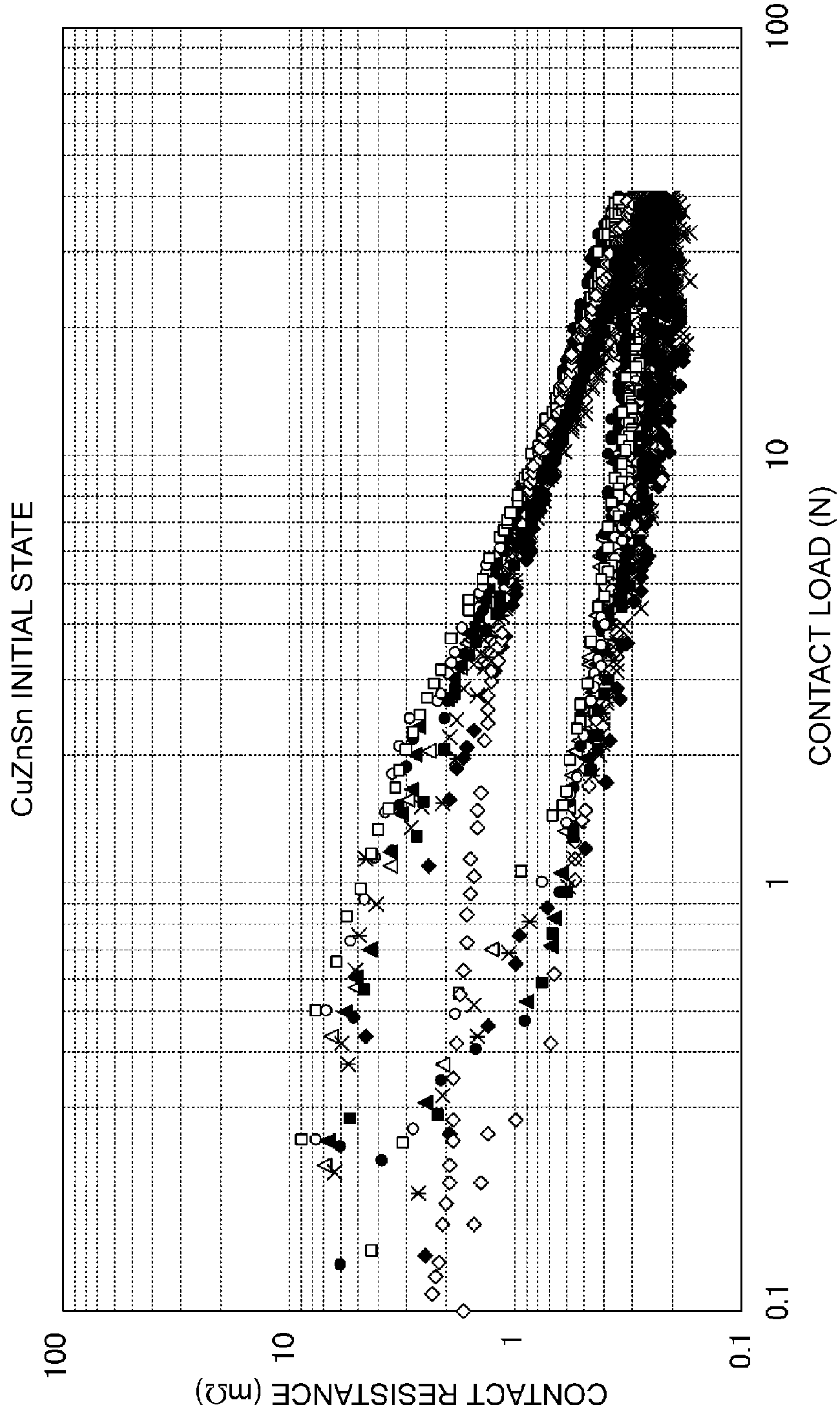
FIG. 6 is an explanatory diagram illustrating initial evaluation results from an electric contact material for a connector (sample E2) in Working Example 2.
Figure 7:
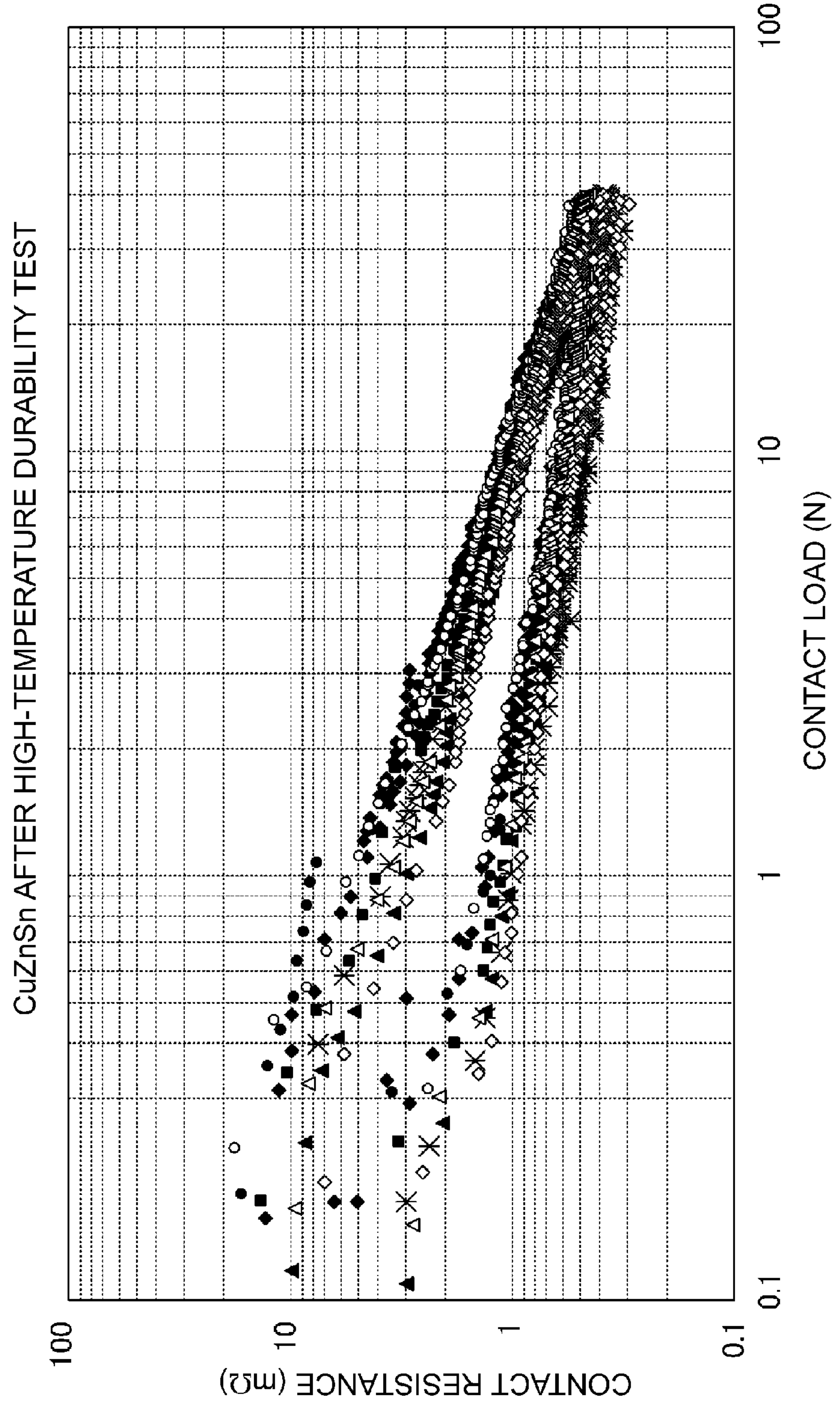
FIG. 7 is an explanatory diagram illustrating evaluation results from the electric contact material for a connector (sample E2) subjected to a high-temperature durability test in Working Example 2.
Figure 8:
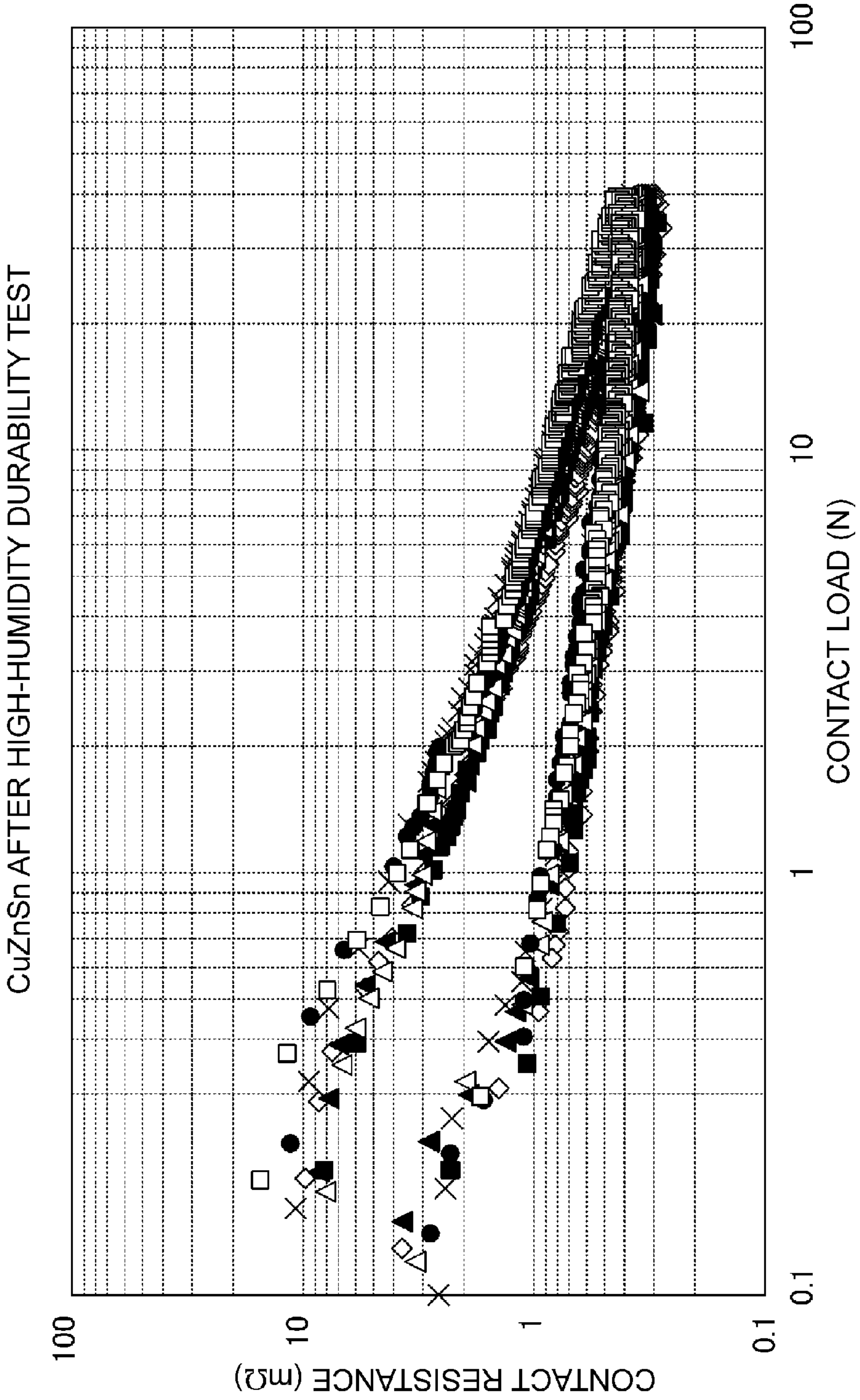
FIG. 8 is an explanatory diagram illustrating evaluation results from the electric contact material for a connector (sample E2) subjected to a high-humidity durability test in Working Example 2.

A sample (referred to as "sample E2") collected from the electric contact material for a connector of this working example, which was obtained in the above-mentioned manner, was evaluated in three ways, namely the initial evaluation, the high-temperature durability test evaluation, and the high-humidity durability test evaluation, in the same manner as in Working Example 1. FIG. 6 shows the initial evaluation for sample E2, FIG. 7 shows the high-temperature durability test evaluation for sample E2, and FIG. 8 shows the high-humidity durability test evaluation for sample E2.

It is clear from these diagrams that although the contact resistance of the electric contact material for a connector of this working example (sample E2) was slightly higher in the high-temperature durability test evaluation and the high-humidity durability test evaluation than in the initial evaluation, all results were favorable because the values were maintained at sufficiently low levels. In particular, it is found that the deterioration after the high-humidity durability test was greatly suppressed compared with Comparative Example 1 provided with a binary alloy layer, which will be described later.

Working Example 3

In an electric contact material for a connector of this working example, the alloy layer 2 in Working Example 1 was changed to a ternary alloy layer containing Sn and Cu as well as Co, and thus the composition of the conductive coating layer 3 was changed.

Producing Method

The electric contact material was produced in the same manner as in Working Example 1, except that a Co layer was formed instead of forming the Ni layer in Working Example 1.

Formation of Co Layer

Composition of liquid in plating bath

Cobalt chloride ($CoCl_2$): 250 g/L

Hydrochloric acid (HCl): 50 g/L

Liquid temperature: 40° C.

Current density: 2 $A/dm^2$

Analysis of Composition

It was found from the results of the composition analysis with EDX that a $(Cu, Co)_6Sn_5$ metal compound was formed in the alloy layer of the obtained working example. Moreover, it was found from the results of the composition analysis with XPS that a mixed oxide including an oxide of Sn, an oxide of Cu, and an oxide of Co was formed in the conductive coating layer of the obtained working example.

Evaluation Test

Figure 9:
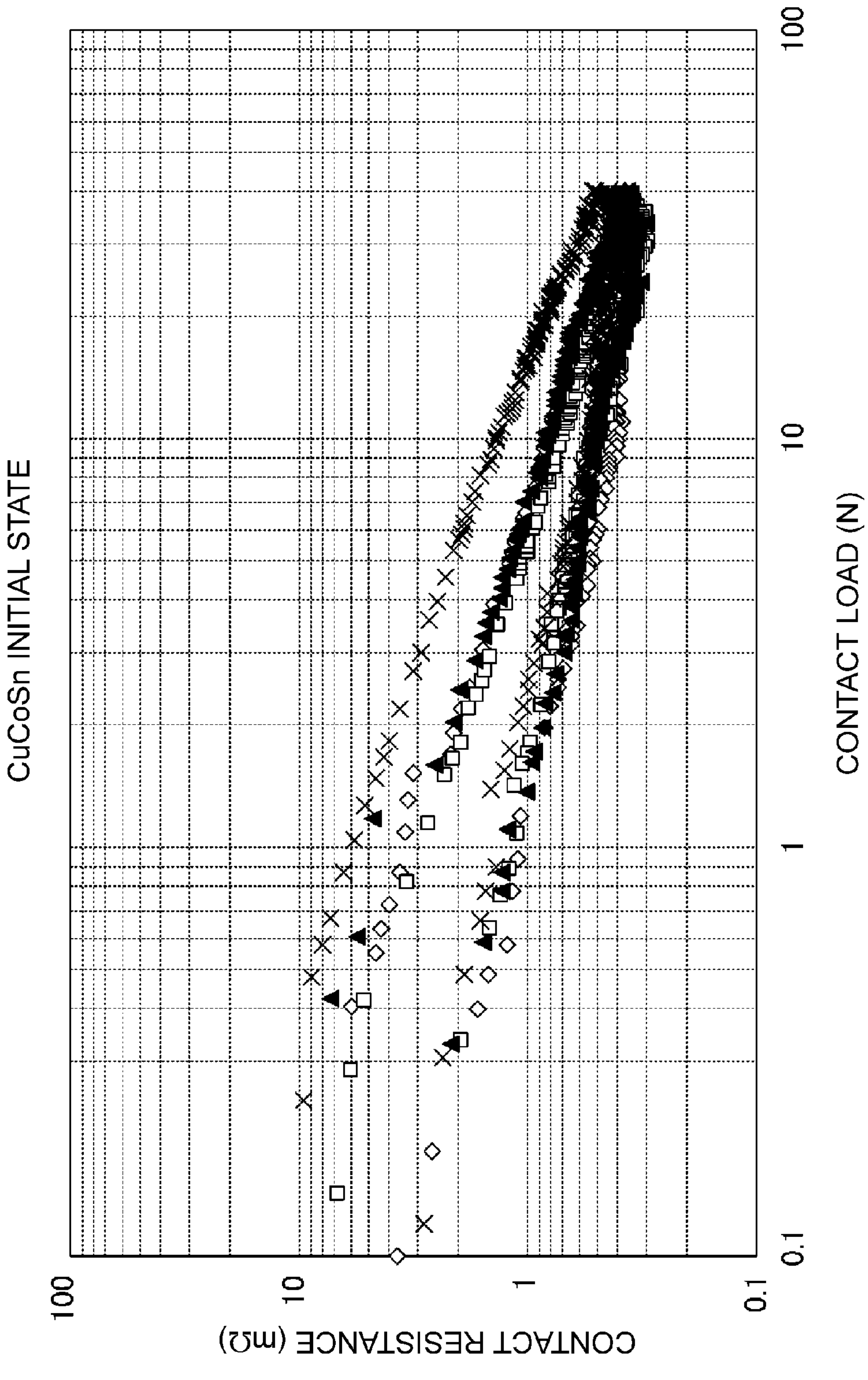
FIG. 9 is an explanatory diagram illustrating initial evaluation results from an electric contact material for a connector (sample E3) in Working Example 3.
Figure 10:
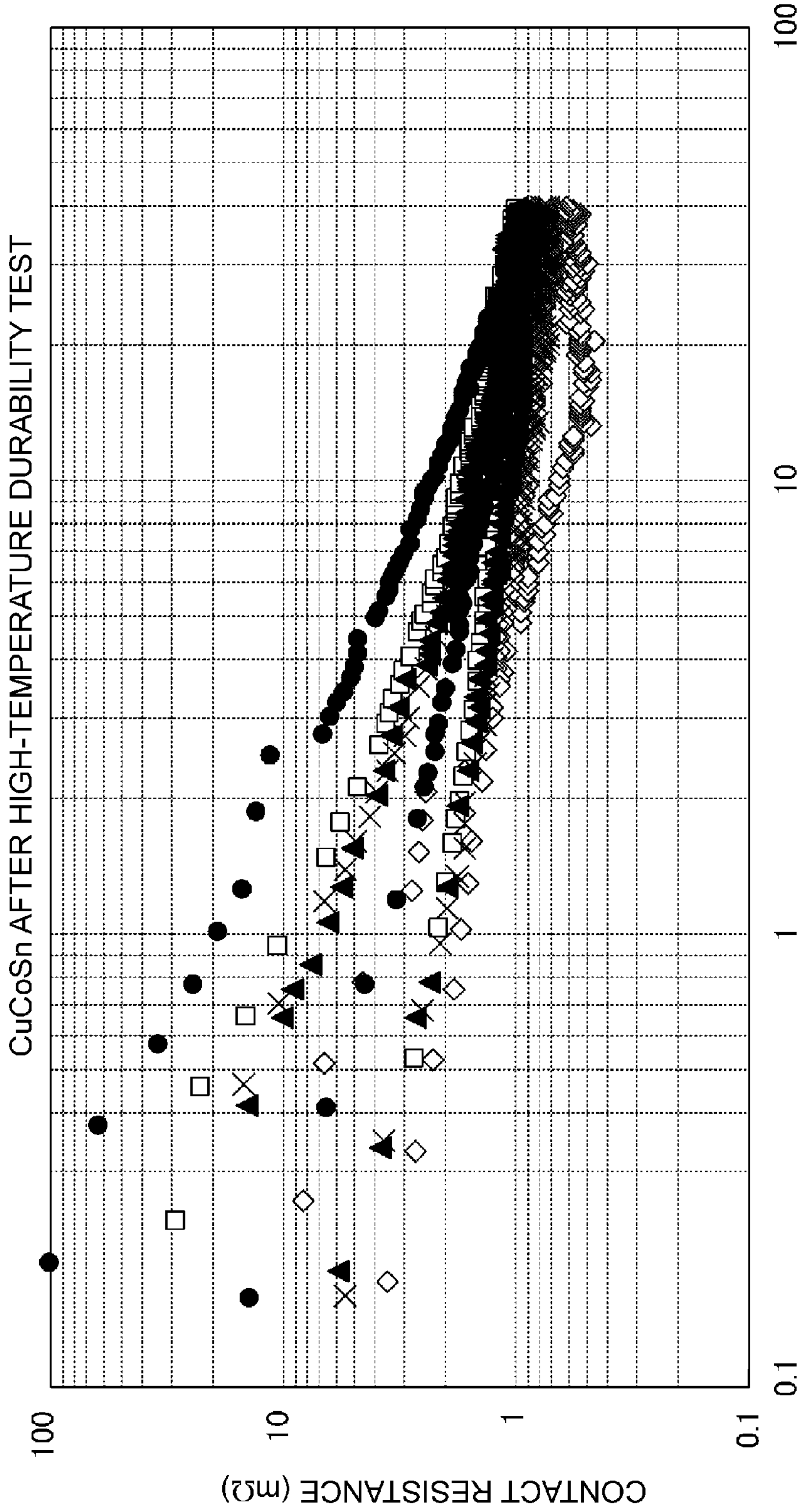
FIG. 10 is an explanatory diagram illustrating evaluation results from the electric contact material for a connector (sample E3) subjected to a high-temperature durability test in Working Example 3.
Figure 11:
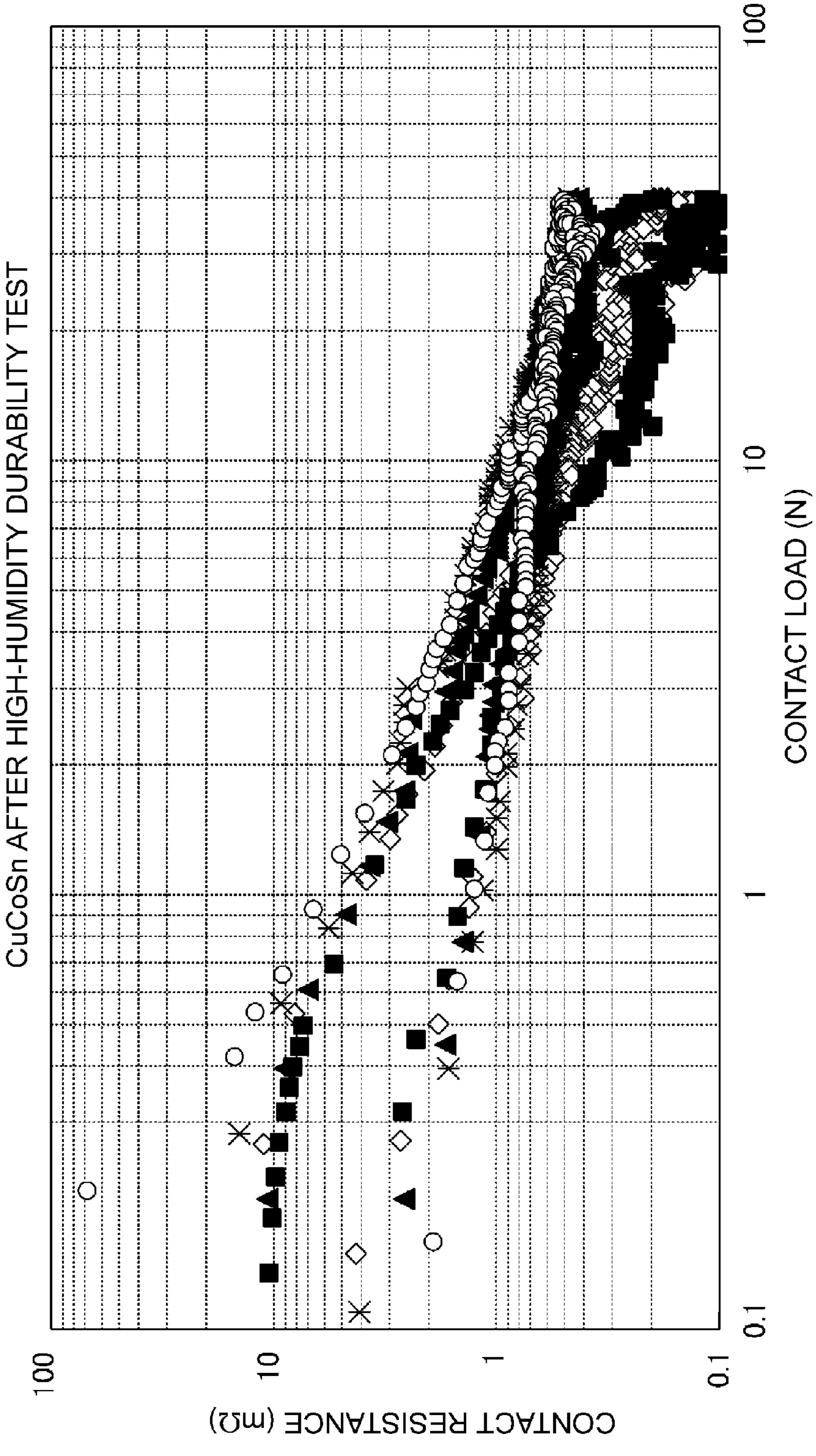
FIG. 11 is an explanatory diagram illustrating evaluation results from the electric contact material for a connector (sample E3) subjected to a high-humidity durability test in Working Example 3.

A sample (referred to as "sample E3") collected from the electric contact material for a connector of this working example, which was obtained in the above-mentioned manner, was evaluated in three ways, namely the initial evaluation, the high-temperature durability test evaluation, and the high-humidity durability test evaluation, in the same manner as in Working Example 1. FIG. 9 shows the initial evaluation for sample E3, FIG. 10 shows the high-temperature durability test evaluation for sample E3, and FIG. 11 shows the high-humidity durability test evaluation for sample E3.

It is clear from these diagrams that although the contact resistance of the electric contact material for a connector of this working example (sample E3) was slightly higher in the high-temperature durability test evaluation and the high-humidity durability test evaluation than in the initial evaluation, all results were favorable because the values were maintained at sufficiently low levels. In particular, it is found that the deterioration after the high-humidity durability test was greatly suppressed compared with Comparative Example 1 provided with a binary alloy layer, which will be described later.

Comparative Example 1

An electric contact material for a connector having a binary alloy layer was prepared as a comparative example. That is, in the electric contact material of Comparative Example 1, the alloy layer 2 in Working Example 1 was changed to a binary alloy layer containing Sn and Cu, and thus the composition of the conductive coating layer 3 was changed.

Producing Method

The electric contact material was produced in the same manner as in Working Example 1, except that the formation of the Ni layer in Working Example 1 was omitted, and that the thickness of the Cu layer formed was changed to a thickness converted such that the atom ratio of Cu to Sn was about 6:5.

Analysis of Composition

It was found from the results of the composition analysis with EDX that a $Cu_6Sn_5$ metal compound was formed in the alloy layer of the obtained comparative example. Moreover, it was found from the results of the composition analysis with XPS that a mixed oxide (or hydroxide) including an oxide (or hydroxide) of Sn and an oxide (or hydroxide) of Cu was formed in the conductive coating layer of the obtained comparative example.

Evaluation Test

Figure 12:
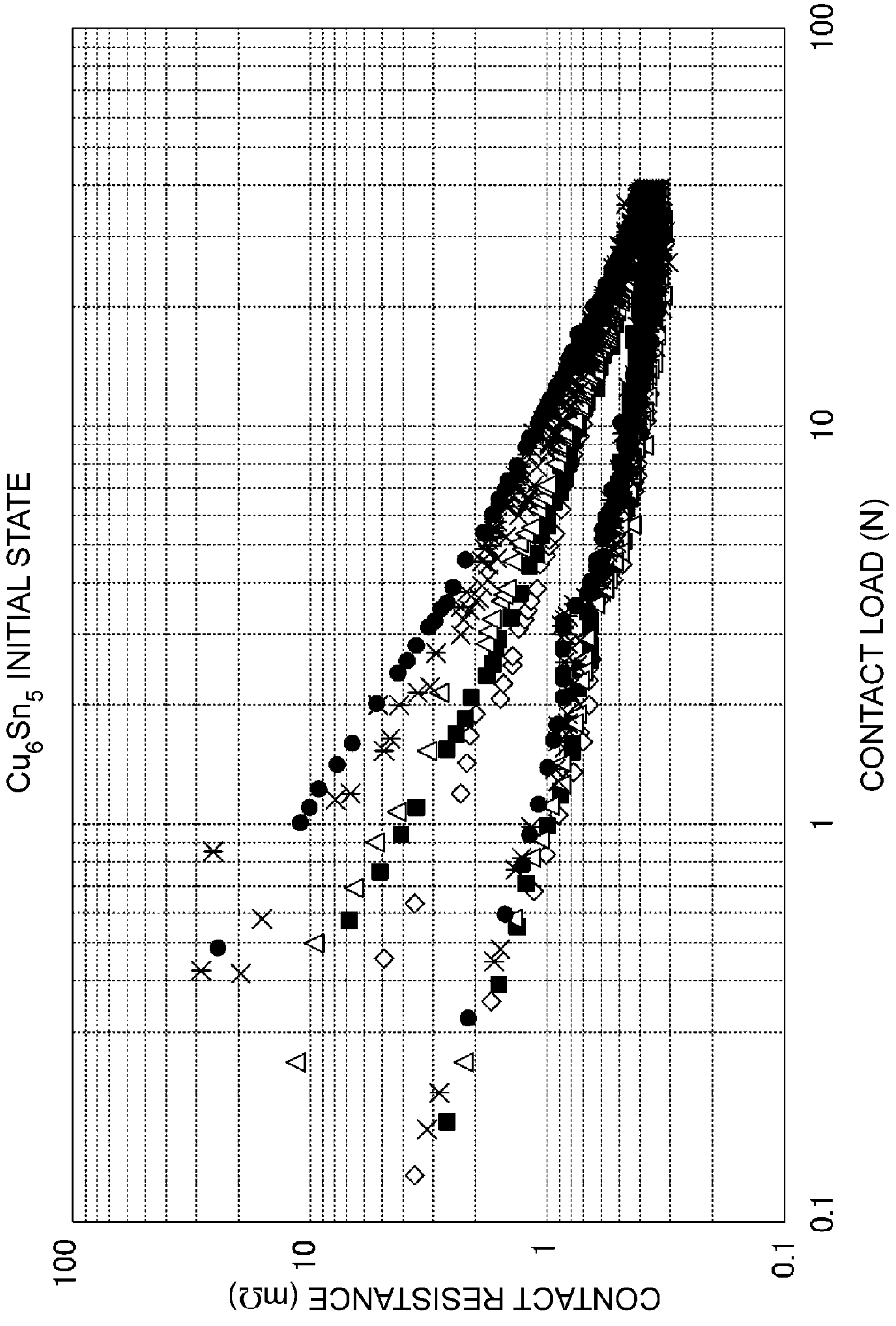
FIG. 12 is an explanatory diagram illustrating initial evaluation results from the electric contact material for a connector (sample C1) in Comparative Example 1.
Figure 13:
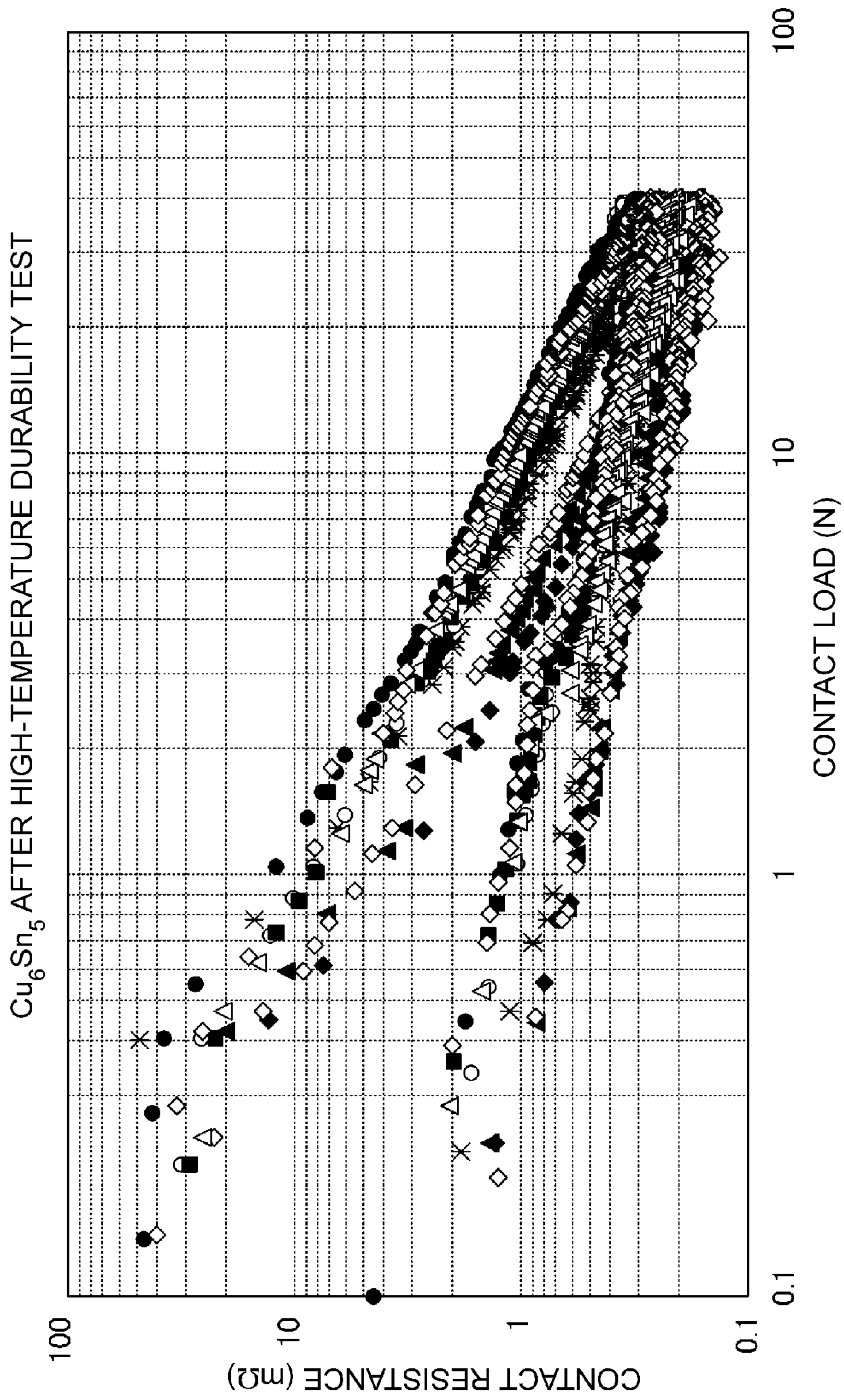
FIG. 13 is an explanatory diagram illustrating evaluation results from the electric contact material for a connector (sample C1) subjected to a high-temperature durability test in Comparative Example 1.
Figure 14:
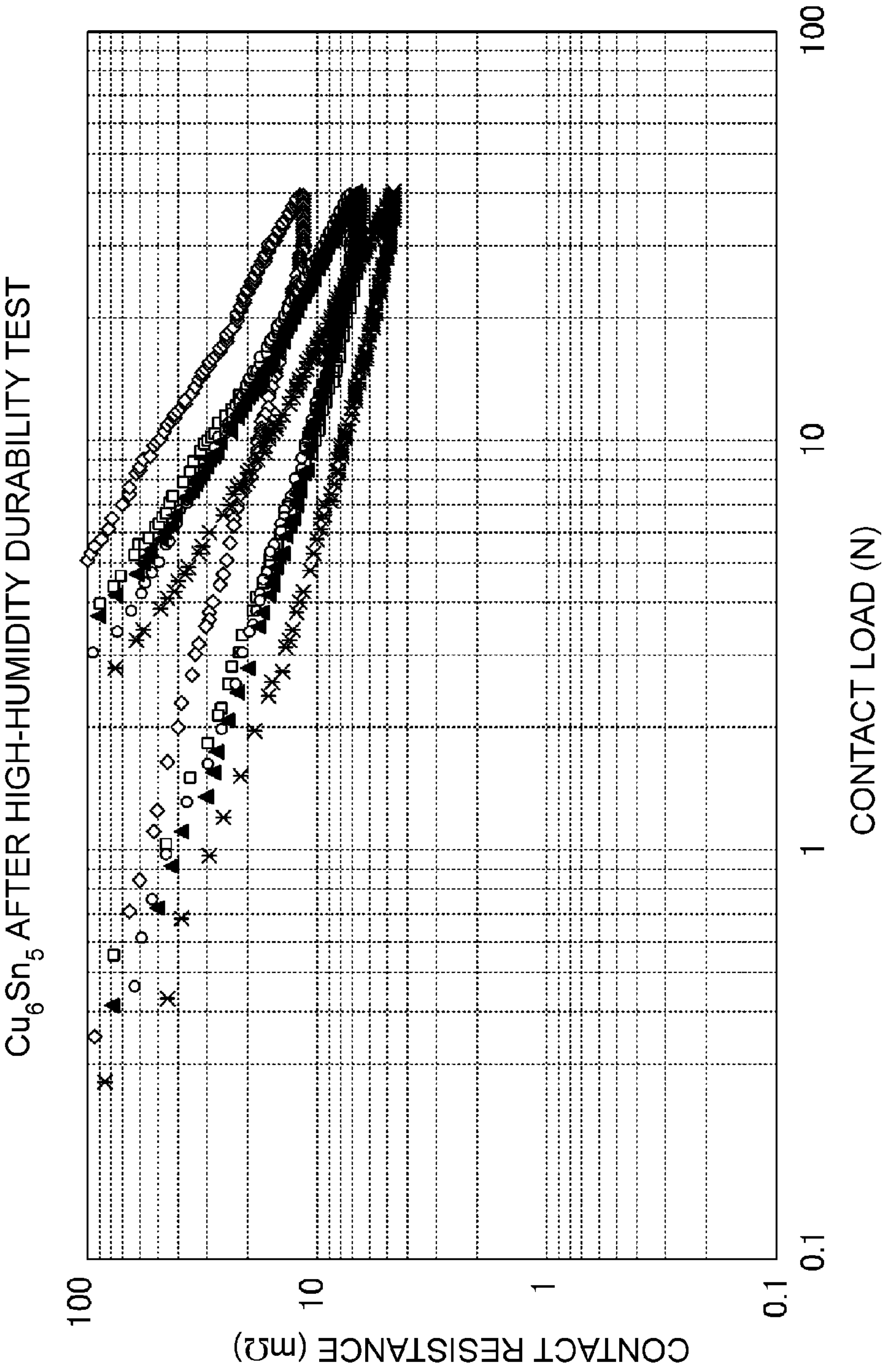
FIG. 14 is an explanatory diagram illustrating evaluation results from the electric contact material for a connector (sample C1) subjected to a high-humidity durability test in Comparative Example 1.

A sample (referred to as "sample C1") collected from the electric contact material for a connector of Comparative Example 1, which was obtained in the above-mentioned manner, was evaluated in three ways, namely the initial evaluation, the high-temperature durability test evaluation, and the high-humidity durability test evaluation, in the same manner as in Working Example 1. FIG. 12 shows the initial evaluation for sample C1, FIG. 13 shows the high-temperature durability test evaluation for sample C1, and FIG. 14 shows the high-humidity durability test evaluation for sample C1.

It is clear from these diagrams that the contact resistance of the electric contact material for a connector of Comparative Example 1 (sample C1) in the high-temperature durability test evaluation was slightly higher than in the initial evaluation and was favorable because the contact resistance had the small absolute value, whereas the electric contact material was significantly deteriorated after the high-humidity durability test, causing the very large contact resistance value.

The invention claimed is:

1. An electric contact material for a connector comprising:

a base material made of a metal material;

a ternary alloy layer that is formed on the base material and contains Sn and Cu in addition to one metal selected from the group consisting of Zn, Co, and Pd; and a conductive coating layer formed on a surface of the ternary alloy layer, wherein the conductive coating layer is made of a conductive oxide or a conductive hydroxide, and the ternary alloy layer contains an intermetallic compound obtained by replacing some Cu atoms in $Cu_6Sn_5$ with one metal selected from the group consisting of Zn, Co, and Pd.

2. The electric contact material for a connector according to claim 1, wherein a content of the one metal selected from Zn, Co, and Pd in the ternary alloy layer is in a range of 1 to 50 atom % relative to a total sum of the Zn, Co, and Pd atom content and a Cu atom content.

3. The electric contact material for a connector according to claim 2, wherein a diffusion barrier layer is provided on a surface of the base material.

4. The electric contact material for a connector according to claim 1, wherein a diffusion barrier layer is provided on a surface of the base material.

5. The electric contact material for a connector according to claim 1, wherein the conductive coating layer is made of the conductive oxide, the conductive oxide containing one or more of the metals included in the ternary alloy layer.

6. The electric contact material for a connector according to claim 1, wherein the conductive coating layer is made of the conductive hydroxide the conductive hydroxide containing one or more of the metals included in the ternary alloy layer.

7. The electric contact material for a connector according to claim 1, wherein the conductive coating layer comprises a mixture of the conductive oxide and conductive hydroxide, where the mixture comprises one or more member selected from the group consisting of $CuO_x$ where $x \neq 1$, $CuO_2$, $SnO_x$ where $x \neq 1$, $ZnO_x$ where $x \neq 1$, $CoO_x$ where $x \neq 1$, and $PdO_x$ where $x \neq 1$.

8. The electric contact material for a connector according to claim 1, wherein the conductive coating layer comprises a compound including one or more member selected from the group consisting of $CuO_x$ where $x \neq 1$, $CuO_2$, $SnO_x$ where $x \neq 1$, $ZnO_x$ where $x \neq 1$, $CoO_x$ where $x \neq 1$, and $PdO_x$ where $x \neq 1$.

9. The electric contact material for a connector according to claim 1, wherein a thickness of the conductive coating layer is about 5 to 500 nm.

10. The electric contact material for a connector according to claim 1, wherein a thickness of the conductive coating layer is about 10 to 200 nm.

11. The electric contact material for a connector according to claim 1, wherein the ternary alloy layer is formed directly on the base material, and the base material is a member selected from the group consisting of Cu, Al, Fe, and an alloy thereof.

12. The electric contact material for a connector according to claim 1, wherein the ternary alloy layer is formed directly on the base material, and the base material is Cu.

13. The electric contact material for a connector according to claim 1, wherein the ternary alloy layer is formed directly on the base material, and the base material is Al.

14. The electric contact material for a connector according to claim 1, wherein the ternary alloy layer is formed directly on the base material, and the base material is Fe.

15. The electric contact material for a connector according to claim 1, wherein the ternary alloy layer is formed directly on the base material, and the base material is an alloy of Cu, Al, and Fe.

16. The electric contact material for a connector according to claim 1, wherein the intermetallic compound of the ternary alloy layer contains Sn, Cu and Pd.

17. The electric contact material for a connector according to claim 1, wherein the intermetallic compound of the ternary alloy layer contains Sn, Cu and Zn.

18. The electric contact material for a connector according to claim 1, wherein the intermetallic compound of the ternary alloy layer contains Sn, Cu and Co.

19. A method for producing an electric contact material for a connector comprising:

forming a multilayered metal layer by laminating a Sn layer, a Cu layer, and an M layer, on a base material made of a metal material such that a metal layer made of a metal that is least likely to be oxidized in the metal layers is an outermost layer, wherein the M layer is a metal layer having at least one layer made of at least one metal selected from the group consisting of Zn, Co, and Pd; and performing a reflow treatment in which the multilayered metal layer is heated in an oxidizing atmosphere after forming the multilayered metal layer to form an alloy layer the alloy layer is made of an alloy containing at least three elements, the at least three elements including Sn and Cu in addition to at least one metal selected from the group consisting of Zn, Co, and Pd, where the alloy layer contains an intermetallic compound obtained by replacing some Cu atoms in $Cu_6Sn_5$ with at least one metal selected from the group consisting of Zn, Co, and Pd being formed on the base material, and a conductive coating layer being formed on a surface of the alloy layer.

20. The method for producing an electric contact material for a connector according to claim 19, wherein a diffusion barrier layer is formed on a surface of the base material prior to forming the multilayered metal layer.

* * * * *